UNITED STATES PATENT OFFICE.

WALTER S. GATES AND HERBERT H. DOW, OF MIDLAND, MICHIGAN, ASSIGNORS, BY MESNE ASSIGNMENTS, TO THE ONTARIO NICKEL COMPANY, LIMITED, OF WORTHINGTON, CANADA, A CORPORATION.

PROCESS OF SEPARATING METALS IN SOLUTION.

956,763. Specification of Letters Patent. Patented May 3, 1910.

No Drawing. Application filed February 12, 1906. Serial No. 300,728.

*To all whom it may concern:*

Be it known that we, WALTER S. GATES and HERBERT H. DOW, citizens of the United States, residents of Midland, county of Midland, and State of Michigan, have invented a new and useful Improvement in Processes of Separating Metals in Solution, of which the following is a specification, the principle of the invention being herein explained and the best mode in which we have contemplated applying that principle, so as to distinguish it from other inventions.

Our invention relates to processes of separating metals and especially to a separation of the same, each substantially free of all the others, when contained in a water solution. Said invention consists of steps hereinafter fully described and specifically set forth in the claims.

The improved results obtained by our new process are effected by reason of the fact which we have discovered that, when a reagent which is capable of precipitating at least one of the metals as an insoluble compound is added to a solution of metals—more or less of the insoluble compounds of the other metals are simultaneously precipitated, depending upon the circumstances of each particular case—if the degrees of insolubility of the insoluble compounds thus precipitated are different and vary among themselves within reasonable limits, and there be present in the original solution enough of the metal, which upon the addition of the reagent forms the more insoluble compound, to be at least a chemical equivalent of the reagent, then, the more insoluble precipitate is purified of its inclusions of the slightly less insoluble precipitates of the other metals by subjecting the original solution and precipitates to a prolonged agitation by means of which the soluble compound of the metal forming the more insoluble precipitate reacts with the precipitates of the other metals to form soluble compounds of said other metals and more of the insoluble precipitate which is being purified.

We find a particular application for our improved process in the separating of iron, copper and nickel from each other, each in the form of a precipitate substantially free of the others, when all are contained in the same original water solution.

We are aware that iron, copper and nickel have been taken from a water solution in the same order and by the same reagents that we use, but we are not aware that products anywhere nearly pure have been obtained in the manner embodying our improved process. However, in fact we do know that large amounts of the valuable metals have been lost in the iron precipitate in other processes.

The fact is well-known that, if two metals are present in a solution, and one of the metals forms a precipitate or an insoluble compound more insoluble than the corresponding compound of the second metal, and there is added to the solution the proper amount of a reagent capable of throwing down the first metal as a precipitate, then, said precipitate will in many cases carry down with it in insoluble form part of the second metal. This will happen, first, always in case the second metal is also capable of being precipitated by the reagent which is used, and secondly, often even if said second metal is not capable of being so precipitated.

As an example of the first case, if a solution of iron and nickel is treated with calcium hydrate, which reagent will precipitate either metal alone, and the reagent is added in the proper amount to precipitate the iron, the iron precipitate will always carry down some insoluble nickel. As an example of the second case, if a solution of iron and nickel, with ammonium chlorid present, be treated with ammonium hydrate, which reagent will precipitate iron alone with ammonium chlorid, but which will not precipitate nickel alone with ammonium chlorid, and the reagent be added in the proper amount to precipitate the iron, the iron precipitate will always carry down some insoluble nickel. In both of these cases, if the nickel were not present in the original solution in an amount much greater than the iron, the iron will predominate in the precipitate because ferric hydrate is more insoluble than nickel hydrate. The usual way in which these precipitations would be made in the laboratory would be to add to the solution of iron and nickel in a beaker the proper amount of reagent and agitate by means of a stirring rod until the mixture became homogeneous and then stop, the idea being that the precipitation of a certain amount of nickel in the iron was unavoidable and irremediable except, of course, by the use of some solvent (such as ammonium hydrate) which will dissolve nickel precipitates but will not dissolve iron precipitates. We are not aware that it has been known that a slow subsequent action is possible by agitating the mixture in the presence of an excess of soluble salt of the metal forming the more insoluble precipitate, in this case iron. It has always been considered impossible to get the iron out free of copper and nickel and in fact has been considered necessary to take out the iron by means of a weak alkali (followed by a strong alkali for the nickel) or else the iron precipitate would contain a very large amount of nickel. By our improved method the iron may be precipitated by as strong an alkali as is used for the nickel, in fact all three metals, iron, copper and nickel, may be removed by the same reagent which may be strong or weak. The old method of purifying such a precipitate of the included metal, such, for instance, as the purifying of ferric hydrate of inclusion of nickel hydrate, is to separate the precipitate from the solution, dissolve it, for instance in an acid, and then reprecipitate with a proper amount of a suitable reagent, whereby all the iron is again thrown down and containing some nickel, but not so much of the latter as before, the difference of nickel being left in the second filtrate. The reason why the nickel exists in the second filtrate in less quantities than it does in the first is because in the acid solution it is in a more disseminated condition with regard to the iron than it was in the original solution, there being less nickel present, and only part of the nickel present being thrown down each time. Therefore a sufficient number of separations in sufficiently dilute solutions will accomplish a quantitative separation, giving all the nickel in the united filtrate which will be very dilute. This method is commonly used in quantitative analysis, and ordinarily four separations under good conditions are sufficient. Our method, however, as ordinarily practiced, while giving the precipitate practically pure, does not at one time remove from the solution all of the metal forming the most insoluble precipitate, because of the fact that the precipitate is afterward purified by agitation in a solution containing an excess of a soluble salt of the metal which is being purified.

Our method is applicable to the commercial separation of metals from a solution which is being supplied more or less continuously to the cycle, giving products commercially or chemically pure as desired.

The following description sets forth in detail certain modes of carrying out the invention, such disclosed modes constituting but a part of the various ways in which the principle of the invention may be used.

The apparatus required to carry out our improved process consists of any suitable form of agitating and containing tanks, and filtering or settling devices, and is the same for the separation of iron, copper and nickel as it is for other metals and substances.

We shall outline now three methods of carrying out our invention, each of which depends for its improved result of obtaining substantially pure precipitates upon the comparative solubilities of the substantially insoluble precipitates which are thrown down from the original solution when a reagent is added thereto in an amount equal to the chemical equivalent of the metal which forms the more insoluble precipitate.

In the first method, the solution of iron, copper and nickel is agitated in any suitable vessel with powdered limestone in an amount equal to the chemical equivalent of the iron present in the solution, the result of which is the almost immediate precipitation of most of the iron as an hydrate, but even in a dilute solution there is some copper and nickel thrown down as basic carbonates. A prolonged agitation of the precipitates in the original solution purifies the iron precipitate of the included copper and nickel basic carbonates because of the comparative solubilities of the ferric hydrate and said basic carbonates, according to the following order of insolubility: Most insoluble, $FeO_3H_2$; less insoluble $CuCO_3.CuO_2H_2$ and $CuO_2H_2$; least insoluble, $NiCO_3.NiO_2H_2$ and $NiO_2H_2$.

The excess of iron salt in solution thus slowly dissolves, under the effect of vigorous agitation, the copper and nickel basic carbonates contained in the insoluble ferric hydrate, and precipitates in turn more ferric hydrate. For instance, suppose the original solution consists of the chlorids of iron, copper and nickel, then the following reactions take place:

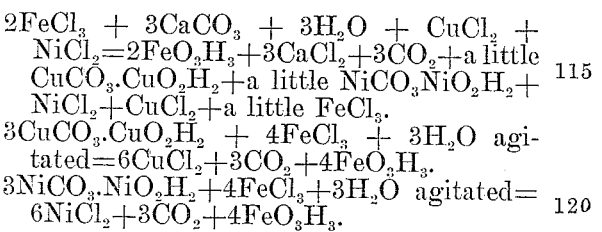

After a prolonged agitation with a proper amount of reagent, the ferric hydrate is found to be substantially free of the included copper and nickel basic carbonates and the solution is found to be free of iron. The precipitate is separated and washed by any convenient method from the copper and nickel solution, the latter going into any suitable container. This copper and nickel solution is agitated with calcium hydrate to the chemical equivalent of the copper present, the result being the almost immediate precipitation of most of the copper as hydrate, which latter contains some nickel as hydrate. A prolonged agitation of this impure copper precipitate in the copper and nickel solution will purify said precipitate of the nickel because of the comparative solubilities of the precipitated hydrates. The excess of the soluble copper salt in the original solution thus slowly dissolves the nickel hydrate contained in the insoluble cupric hydrate and precipitates in turn more cupric hydrate. The reactions are as follows:

$$CuCl_2 + NiCl_2 + CaO_2H_2 = CuO_2H_2 + CaCl_2 + NiCl_2 + a \text{ little } CuCl_2 + a \text{ little } NiO_2H_2.$$

$$NiO_2H_2 + CuCl_2 \text{ agitated} = CuO_2H_2 + NiCl_2.$$

After a prolonged agitation with the proper amount of calcium hydrate the cupric hydrate is found to be substantially free of the nickel hydrate and the solution is free of copper. The cupric hydrate is separated and washed from the nickel solution, the latter going into any suitable container. This nickel solution is treated with any suitable reagent, such as calcium hydrate, the result being the almost immediate precipitation of all of the nickel present, free from the iron and copper, without prolonged agitation, the reaction being:

$$NiCl_2 + CaO_2H_2 = NiO_2H_2 + CaCl_2.$$

This first method, specifically set up and claimed, forms the subject matter of a separate application, filed April 3, 1907, Serial No. 366,159.

This second method of accomplishing the separation of iron, copper, and nickel consists in adding to a portion of the original solution of the three metals named less than the chemical equivalent of a reagent capable of precipitating the iron, agitating until the iron precipitate is freed of its included copper and nickel and separating such purified iron precipitate from the copper and nickel and iron solution. Then add to this solution some more of the reagent in an amount slightly in excess of that which is required as a chemical equivalent of the remaining iron, thus precipitating the balance of the iron as an impure precipitate containing copper and nickel, removing this impure precipitate from the solution and putting it with a quantity of precipitate which is being purified in the manner just mentioned, whereby this impure precipitate of the balance of the iron is purified by a prolonged agitation in the original solution containing an excess of soluble iron salt. This method amounts, in effect, to the addition of just the chemical equivalent of the reagent, since the impure copper and nickel in the iron precipitate act as a reagent during the purifying agitation to produce more of the insoluble iron precipitate and more of the soluble copper and nickel compounds. This same method may be repeated for the separation of copper and nickel from each other in the above resulting solution. This second method, specifically set up and claimed, forms the subject matter of a separate application, filed April 27, 1907, Serial No. 370,741.

The third method of separating iron, copper and nickel consists in adding to a portion of the original solution a reagent in an amount sufficient to remove all the iron, which will thus be impure, containing copper and nickel. The reagent thus added will be in excess of the chemical equivalent of the iron in the solution by exactly the amount of copper and nickel impurities in the iron precipitate. This impure precipitate is separated from the solution, the latter thus being copper and nickel, which is free of iron. The precipitate is purified by a prolonged agitation with more of the original solution containing soluble iron salts and is then removed and washed clean of the solution, which is iron, copper and nickel in solution, the latter being added to the original iron, copper and nickel liquor, and the separation is complete. This method also amounts, in effect, to adding the reagent in an amount just the chemical equivalent of the iron in the original solution, since the impure copper and nickel contained in the precipitated iron act as a reagent in the purifying agitator and throw down from the added solution iron in a quantity the exact equivalent of these impurities and equal to the excess of the reagent originally added, whereby the added liquor now requires less of the reagent by the same amount and thus a given quantity of original iron, copper and nickel liquor is, by the time the cycle is completed, treated with a reagent to exactly the chemical equivalent of its iron. This method is also equally applicable to the separation of the resulting solution of copper and nickel.

We have found that the second and third methods outlined above are preferable to the first method, for the reason that in the second and third methods the purifying step is accomplished at all times in a strong solution of the soluble iron salt, and therefore quicker results are obtained; since, in the first method, the first precipitated iron is purified in a strong solution of the soluble iron salt but the later precipitated iron is purified in an iron solution of decreasing strength since the reagent or the impure copper and nickel precipitates acting as reagents continually impoverish the original solution of the soluble iron salt, and gradually approach the condition where no soluble iron salt remains and where no copper and nickel remain in the insoluble iron precipitate, and therefore the purification of the iron goes on with decreasing speed to the end. Furthermore, the first method requires careful supervision as regards tests and the addition of reagents, in order that there may be added the proper amount of the latter; whereas, the second and third methods require very little supervision inasmuch as an excess of reagent, in the step of taking out all the iron, is provided for in the purification.

Of course it will be remembered that the separation takes place as well with the salts of the other mineral acids and mixtures as it does with the chlorid solutions.

In the above description and the following claims we mean to include in the term "iron" the metal in both conditions of oxidation.

We mean to include in the term "nickel" the nickel group of similar metals, viz. nickel and cobalt alone and together.

We mean by the term "prolonged agitation" agitation for a length of time greater than that ordinarily required by a chemical reagent to act on a solution which is capable of being precipitated by it, and make the resulting mixture homogeneous.

We mean by the term "chemical equivalent of a reagent" such an amount of that reagent as actually and finally enters into the reaction, since the cores of some particles of insoluble reagent might not react and it would be necessary, therefore, to add the reagent in a quantity in excess of that representing the theoretical chemical equivalent.

We mean by the term "insoluble precipitates" those that are more insoluble than the hydrates of barium and calcium, for instance, the hydrates and carbonates of iron, aluminum, copper, nickel, etc.

It is a well-known law, of course, that the insoluble compounds tend to form and precipitate; for instance, the following reaction naturally takes place immediately:

$$CaO_2H_2 + MgCl_2 = MgO_2H_2 + CaCl_2.$$

However, our improved process cannot be classified as coming solely under this broad head, but rather is a simultaneous dissolving to the very slight amount possible, of the more soluble component of a substantially insoluble mixture, and a precipitation from the solution of the other metal which is contained also as the more insoluble compound in the original insoluble mixture.

There are several reagents any one of which might be used in certain steps of our process. Instead of calcium carbonate in the precipitation of the iron, other alkaline and alkaline earth carbonates and hydrates may be substituted, such as calcium hydrate and sodium hydrate. For the calcium hydrate in the copper precipitation there might be substituted such alkaline or alkaline earth carbonates and hydrates as calcium carbonate, sodium hydrate and sodium carbonate. If any one of the three metals, iron, copper and nickel, is absent, the other two may be separated and purified as described above, simply omitting the steps required by our process for that particular metal which is absent. For instance, iron could be separated from nickel alone; from copper alone; or copper could be separated from nickel alone.

It sometimes happens that when a strong solution of a valuable element, for instance nickel, is present, such solution containing small quantities of an impurity, for instance iron, the addition of the usual reagents, such as calcium carbonate, sodium carbonate, calcium hydrate, etc., would introduce undesirable soluble impurities. In this case, we can purify a solution of iron and nickel from the iron by a prolonged agitation with nickel hydrate instead of with calcium carbonate, calcium hydrate, etc., in an amount exactly equal to the chemical equivalent of the iron present, the resulting precipitate of all the iron present being free of nickel. In like manner a solution of iron and copper can be purified of iron by means of cupric hydrate; a solution of copper and nickel can be purified of copper by means of nickel hydrate; and a solution of iron, copper and nickel can be purified of iron and copper by means of nickel hydrate. It will be noted that in this case we are using original nickel hydrate or copper hydrate, as the case may be, to purify a solution instead of using such copper or nickel hydrate contained as an impurity in an insoluble iron compound precipitated from the original solution, as outlined in each of the three methods described above.

It sometimes happens that a change of temperature from the ordinary is an aid to the separation by causing an appreciable difference in the slight solubilities of the two insoluble substances, which have, at ordinary temperatures, solubilities so nearly identical that an economic separation is prevented. For instance, compounds of cobalt and nickel might have substantially the same solubilities at a temperature of 20 degrees; whereas at 60 degrees their solubilities might be so different as to allow of an economic separation by our process.

If, at any time, more of the reagent is added than the chemical equivalent of the metal to be precipitated, the condition of equilibrium can be restored by the addition of more of the original solution, which amounts, in effect, to the adding of the chemical equivalent.

Our method does not give dilute solutions and yet we obtain pure precipitates of the iron copper and nickel instead of the impure precipitates which are obtained by present methods, and the basic principle of our process is the purification of any precipitated metal or substance of the inclusions of other precipitated metals or substances slightly more soluble than the first, all of the precipitates being substantially insoluble—although nothing is absolutely insoluble in a solvent—by means of agitating such impure precipitate in a solution containing soluble salts of the more insoluble metal. We do not confine ourselves to the use of water as a solvent for obtaining the original solution. Where both or all of the metals in solution are capable of being precipitated by the reagent used, there has often been left and lost as much as 25% impurity, for instance, of nickel in the iron: whereas, we are able, by our method, to free the iron precipitate entirely of the nickel impurity by a sufficiently long and vigorous agitation.

Our method, of course, works best on substances which, although insoluble, are colloidal and freely disseminated, since, thus, infinitely great surfaces are constantly presented for solution and subsequent immediate action of the soluble salt.

We wish to point out that, if the addition of the required amount of reagent be made so gradually that it extends over a considerable length of time during which agitation is going on, this amounts in substance to "adding the required amount of reagent and then subjecting the mixture to prolonged agitation."

By the expression "the metal which is being purified" in the description and claims, we mean the metal which we are trying to remove as a precipitate free of the other metals, except in specification above and claims covering it wherein a solution is purified by subjecting it to a prolonged agitation with a precipitate of the valuable metal, as, for instance, purifying a solution of iron and nickel from the iron by prolonged agitation with nickel hydrate, in which case it is the metal left in solution that is purified.

Having thus described our invention in detail, that which we particularly point out and distinctly claim is:—

1. In a process of separating iron, copper and nickel, in solution, the steps which consist in precipitating the same from their solution in the form of relatively insoluble basic compounds, one compound, however, varying from the other in its degree of solubility; and then successively purifying the less soluble compound of any inclusions of a more soluble compound by subjecting such compounds to agitation in a solution containing a soluble salt of the metal forming the less soluble compound until such included compound is substantially dissolved out.

2. In a process of separating iron and nickel in solution, the steps which consist in adding to a portion of the solution a reagent capable of producing a less soluble precipitate with the iron than with the nickel; removing the iron precipitate; and then subjecting such precipitate to a prolonged agitation in another portion of the original iron-nickel solution until said nickel precipitate is substantially dissolved out.

3. In a process of purifying an iron precipitate of inclusions of hydrates and basic carbonates of copper and nickel, said iron precipitate being slightly less soluble than said hydrates and carbonates, the step which consists in subjecting said precipitate to agitation in a solution containing soluble iron salts until inclusions of said hydrates and carbonates are substantially dissolved out.

4. In a process of purifying ferric hydrate of inclusions of hydrates and basic carbonates of copper and nickel, the step which consists in subjecting said ferric hydrate to agitation in a solution containing soluble iron salts until said inclusions of hydrates and basic carbonates are substantially dissolved out.

5. In a process of separating iron, copper and nickel, in solution, the steps which consist in adding to a portion of the solution a reagent capable of producing a less soluble precipitate with the iron than with the copper and nickel; removing the iron precipitate; adding the same to another portion of the original iron-copper-nickel solution; subjecting the mixture to agitation until the iron precipitate is substantially freed of any inclusions of copper and nickel precipitate; removing the iron precipitate; returning the filtrate to another portion of the original iron-copper-nickel solution, to which is being added as described above, a reagent capable of producing an insoluble precipitate with the iron; adding to the copper-nickel solution remaining after the removal of the iron precipitate a reagent capable of producing a less soluble precipitate with the copper than with the nickel; removing the copper precipitate; and, then subjecting such copper precipitate to agitation in another portion of the copper-nickel solution until it is substantially purified of any inclusions of nickel precipitate.

6. In a process of separating one metal substantially free from another, such metals being contained in a solution, the steps which consist in adding to a quantity of the solution a reagent capable of producing a relatively insoluble precipitate with one of the metals, such reagent being added in an amount sufficient to actually precipitate all of such metal, and then agitating such precipitate in a second quantity of the original solution until it is substantially purified of any inclusions of the other metal.

7. In a process of separating metals, each substantially free of the others, such metals being contained in a solution, the steps which consist, in repeating the following cycle of operations until each metal has been successively separated out; adding to a portion of the solution a reagent capable of producing a less soluble precipitate with that metal which it is desired to separate out than with the other metals, such reagent being added in an amount sufficient to actually precipitate all of the said metal; removing this precipitate; and then agitating the same in another portion of the solution from which said metal has not as yet been precipitated, such agitation being prolonged until any inclusions of the other metals are substantially dissolved out.

8. In a process of separating metals in solution, the steps which consist in adding to a quantity of the solution a reagent capable of forming substantially insoluble precipitates with said metals, one precipitate, however, being slightly less soluble than the others, such reagent being added in an amount sufficient to actually precipitate all of the metal forming such less soluble precipitate; purifying such less soluble precipitate of the inclusions of the other precipitates by subjecting the same to agitation in another quantity of the original solution until such precipitates are substantially dissolved out; removing such purified precipitates; and then repeating the foregoing steps with such second quantity of solution.

9. In a process of separating metals in solution, the steps which consist in adding to a quantity of the solution a reagent capable of forming substantially insoluble precipitates with said metals, one precipitate, however, being slightly less soluble than the others, such reagent being added in an amount sufficient to actually precipitate all of the metal forming such less soluble precipitate; purifying such less soluble precipitate of the inclusions of the other precipitates by subjecting the same to agitation in another quantity of the original solution until such other precipitates are substantially dissolved out; similarly precipitating from the solution remaining after such first precipitation another metal; purifying such second precipitate in another quantity of solution from which the first metal only has been precipitated; and thus continuing until all the metals are separated.

10. In a process of separating iron and nickel in solution, the steps which consist in adding to a portion of the solution a reagent capable of producing a less soluble precipitate with the iron than with the nickel, such reagent being added in an amount sufficient to actually precipitate all the iron; and then removing and purifying the iron precipitate of any inclusions of nickel precipitate by subjecting the same to agitation in a solution containing soluble iron salts until such nickel precipitate is substantially dissolved out.

11. In a process of separating iron and nickel in solution, the steps which consist, in adding to a portion of the solution a reagent capable of producing a less soluble precipitate with the iron than with the nickel, such reagent being added in an amount sufficient to actually precipitate all the iron; removing the iron precipitate; and, then, subjecting the same to agitation in another portion of the original iron-nickel solution until any inclusions of nickel precipitate are substantially dissolved out.

12. In a process of separating iron, copper, and nickel, in solution, the steps which consist in adding to a portion of the solution a reagent capable of producing a less soluble precipitate with the iron than with the copper and the nickel, such reagent being added in an amount sufficient to actually precipitate all of the iron; removing the iron precipitate and purifying the same of inclusions of copper and nickel precipitates by agitation in a solution containing soluble iron salts until such copper and nickel precipitates are substantially dissolved out; adding to the pure copper-nickel solution, remaining after the removal of such iron precipitate, a reagent capable of producing a less soluble precipitate with the copper than with the nickel, such reagent being added in an amount sufficient to actually precipitate all of the copper; and then removing the copper precipitate and purifying the same of inclusions of nickel precipitate by agitation in a solution containing soluble copper salts until such nickel precipitate is substantially dissolved out.

13. In a process of separating iron, copper and nickel, in solution, the steps which consist, in adding to a portion of the solution a reagent capable of producing a less soluble precipitate with the iron than with the copper and nickel, such reagent being added in an amount sufficient to actually precipitate all the iron; removing the iron precipitate; adding the same to another portion of the iron-copper-nickel solution; subjecting the mixture to agitation until any inclusions of copper and nickel precipitate are dissolved out; removing the iron precipitate; returning the filtrate to another portion of the original iron-copper-nickel solution, to which is being added as described above, a reagent capable of producing an insoluble precipitate with the iron in an amount sufficient to actually precipitate all the iron; adding to the pure copper-nickel solution a reagent capable of producing a less soluble precipitate with the copper than with the nickel, such reagent being added in an amount sufficient to actually precipitate all of the copper; removing the copper precipitate; and, then, subjecting the same to agitation in another portion of the copper-nickel solution until any inclusions of nickel precipitate are substantially dissolved out.

14. In a process of separating iron and nickel in solution, the steps which consist in adding to a portion of the solution an amount of powdered lime-stone sufficient to actually precipitate all the iron therefrom as ferric hydrate; and then removing and purifying such ferric hydrate of any inclusions of nickel hydrate or basic carbonate by subjecting the same to agitation in another portion of the original solution until such nickel hydrate or basic carbonate is substantially dissolved out.

15. In a process of separating iron, copper and nickel in solution, the steps which consist in adding to a portion of such solution an amount of powdered lime stone sufficient to actually precipitate all the iron therefrom as ferric hydrate; removing such ferric hydrate and purifying the same of inclusions of copper and nickel hydrates or basic carbonates by agitation in another portion of the original solution until such copper and nickel hydrates or basic carbonates are substantially dissolved out; adding to the pure copper-nickel solution remaining after the removal of the iron an amount of calcium hydrate sufficient to actually precipitate all the copper; and then removing the copper precipitate and purifying the same of inclusions of nickel precipitate by agitation in a second quantity of copper-nickel solution until such nickel precipitate is substantially dissolved out.

Signed by us, this 22nd day of January 1906.

WALTER S. GATES.
HERBERT H. DOW.

Attested by—
G. L. CAMP,
E. BARSTOW.